United States Patent

[11] 3,583,418

[72] Inventor Harry Marioneaux
       3020 Vine Street, Riverside, Calif. 92507
[21] Appl. No. 761,446
[22] Filed Sept. 23, 1968
[45] Patented June 8, 1971

[54] BALL AND DISC VALVE ASSEMBLY FOR A CARBURETOR
     4 Claims, 6 Drawing Figs.
[52] U.S. Cl. ................................................. 137/444,
                                  137/449, 137/533.11, 251/333
[51] Int. Cl. ...................................................... F16k 31/26
[50] Field of Search .......................................... 137/442,
                        444, 449, 519.5, 533.11; 251/333, 334

[56]              References Cited
              UNITED STATES PATENTS
3,269,406  8/1966  Grose ............................ 137/449X 3,454,036  7/1969  Thompson ..................... 137/444X Primary Examiner—William F. O'Dea
Assistant Examiner—David R. Matthews
Attorney—John H. Crowe ABSTRACT: An improved float valve for an automobile carburetor having an elongate body with a feed fuel passageway running coaxially into it from one end and a hollow opening into it from the other end. Retained within the hollow are a resilient disc and a ball. The passageway extends into the hollow through a tubular segment having a downstream mouth against which the disc fits to close the valve. The valve is actuated by a float lever arm acting on the disc through the ball and its body has fuel escape holes downstream of the passageway and beyond the reach of the disc or the ball.

PATENTED JUN 8 1971
3,583,418
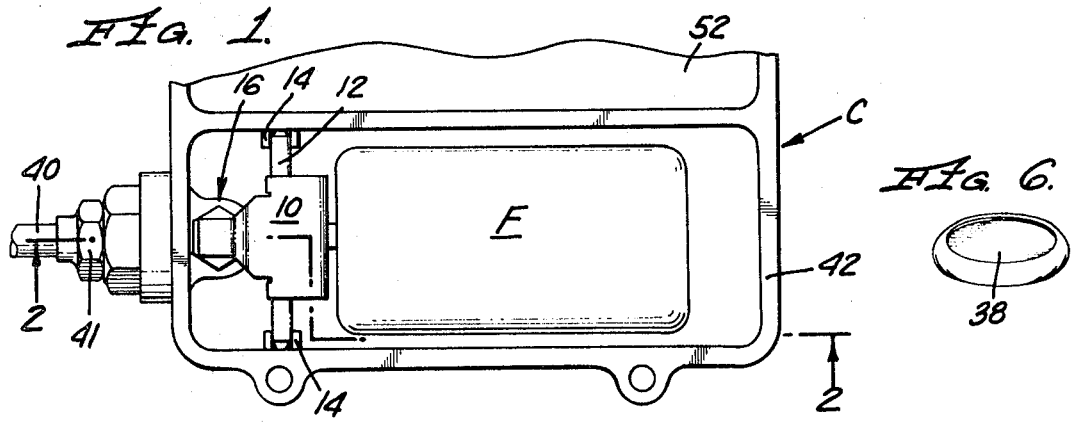
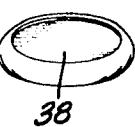
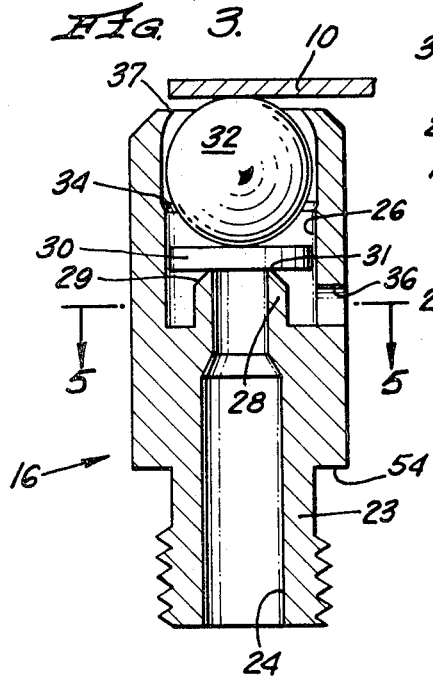
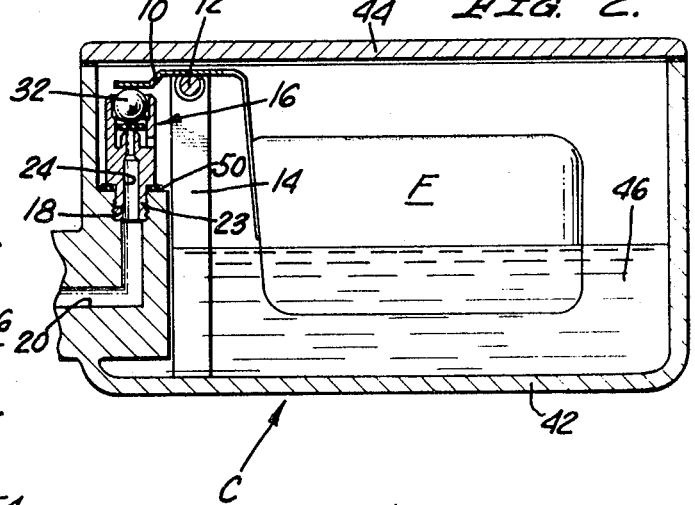
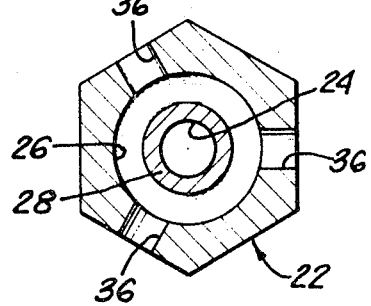
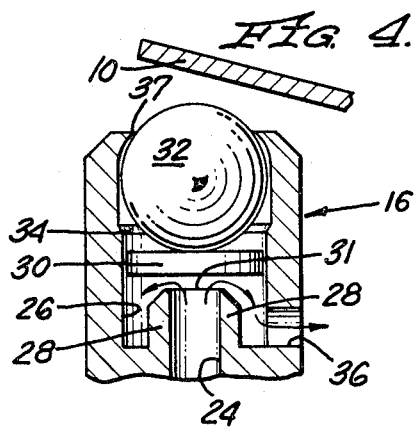
INVENTOR.
HARRY MARIONEAUX
BY John H. Crowe
AGENT

BALL AND DISC VALVE ASSEMBLY FOR A CARBURETOR

BACKGROUND OF THE INVENTION

This invention relates generally to a liquid flow control valve of improved type, and more particularly to such a valve suitable for use in controlling the fuel input to internal combustion engine carburetor float chambers for maintenance of the proper fuel levels therein.

As is well known among those skilled in the automotive arts, relatively high input fuel pressures are common in present-day internal combustion engines. Such pressures have created an increasing need for dependable carburetor float valves capable of efficient operation under the more rigorous conditions thereby obtaining, as compared to the conditions under which their earlier predecessors operated. In this connection, needle valves have been heretofore employed almost exclusively as the valve components of carburetor float valve assemblies, and it will be appreciated by those familiar with internal combustion engines that such assemblies are employed to control carburetor float chamber fuel levels. It will also be apparent that proper maintenance of these fuel levels is of the utmost importance for the proper functioning of internal combustion engines.

The typical needle valve has a body with an inlet fuel passageway in communication with an enlarged hollow housing a plunger with a conical end, or nose, positioned to move into, and out of, contact with a valve seat formed at the downstream end of the passageway. This valve seat comprises an encircling rim of the downstream passageway opening, and is sometimes sharp-edged and sometimes contiguous with a flare at the end of the defining wall of the passageway. The valve body and plunger are designed for installation in a carburetor float valve assembly so as to permit actuation of the plunger by a float in the carburetor float chamber as the float moves up and down with the level of fuel in the chamber. The plunger is thus induced to move in such fashion as to urge its conically shaped end in and out of the opening in the inlet fuel passageway defined by the valve seat, thereby actuating the valve between closed and open positions, depending upon the fuel level in the float chamber.

In a conventional needle valve such as described above, the valve body and plunger are both of metal construction, with the result that there is metal-to-metal contact between the conically shaped end of the plunger and the valve seat in the valve body when the valve is in its closed position. This is known to produce relatively rapid wear and deformation of the involved parts at their areas of contact, particularly under the high fuel pressure conditions existing in high-compression engines such as those found in most present-day automobiles. The resulting wear and tear on the needle valve parts causes early failure of the valves and constitutes a serious shortcoming of such valves, at least where employed as components of carburetor float valve assemblies.

In addition to the above-mentioned wear and deformation disadvantages of conventional needle valves of the metal-to-metal contact type, such valves are subject to plunger-valve seat misalignment as a result of engine vibration, rough automobile travel, or other inducement, and consequent leakage of fuel past the valve seat and into the float chamber. Moreover, such valves are inherently vulnerable to leakage through the possibility of minute particles of dirt, or other foreign substances commonly found in engine fuels, becoming jammed between their valve seats and plungers in such a way as to prevent complete valve closure. This leakage is detrimental since it can raise fuel levels in carburetor float chambers high enough to cause carburetor flooding and wasteful enrichment of air-fuel feed mixtures to automobile engines. In addition to being wasteful of fuel, such enrichment can result in engine stalling and/or starting difficulties.

Because of partial blocking of its valve seat opening by a portion of the conical tip of its plunger, between the fully open and fully closed positions of the latter in a needle valve, it will be apparent that a substantial lowering of the fuel level in a carburetor float chamber is required for maximum fuel flow through such a valve. As a result, engines having carburetors with needle valves are subject to loss of efficiency at high speeds, where float chamber fuel levels are frequently out of phase with maximum fuel flow through the valves. The inability of carburetors to deliver proper amounts of fuel to engines running at high speeds results not only in poor performance, but can lead to burnt valves and/or other engine damage.

Needle valves, by their nature, require valve seat openings of relatively large diameter to accommodate the conical noses of their plungers as the latter move in and out of the openings during operation of the valves for fuel flow control purposes. As a result, the valve seat areas over which fuel pump pressures operate are sufficiently great, in conventional needle valves, to prevent adequate valve closure against such pressures when the latter reach their higher levels and opposing fuel pump valves are incapable of "leaking back." Obviously, a significant reduction in the valve seat area of a needle valve would reduce the total pressure on its plunger when the latter is in its valve-closed position, but such reduction is inconsistent with effective needle valve design and manner of operation.

Various modifications of the conventional needle valve, as well as alternative valve structures of other types, have been proposes for use in carburetor float valve assemblies. All such modifications and alternative valve forms of which I am aware are purported to be absent certain of the needle valve shortcomings discussed above by virtue of partial construction of a suitable resilient material to effectuate better sealing between the valve seat and a plunger, or equivalent movable member, when the valve is closed; the inclusion of means to permit lateral movement of a sealing valve element to minimize the possibility of valve part misalignment when the valve is closed (for cutting down leakage, etc.) No such substitute for the conventional needle valve is, however, at least insofar as I am aware, free of all the above-noted disadvantages of the latter. Moreover, those needle valve substitutes with which I am familiar all have one disadvantageous feature in common with the conventional needle valve, namely, an elongate counterpart of the needle valve plunger, which moves slidably within a hollowed-out space in a valve body similarly to the way in which the plunger of the needle valve moves in such a space within its own body. Inherent in any such arrangement, where an elongate member moves slidably within a receptive hollow in a larger member, is the ever-present possibility of the movable member becoming stuck, or cocked, in a position of misalignment within the hollow, particularly where the involved assembly is subject to jarring, jostling, or vibrating impulses such as those to which carburetor float valves are subjected in use as a result of engine vibration, vehicle shimmy from any of various causes, etc.

The above-described condition of misalignment between an elongate movable member and body member of a valve can cause valve leakage, whether or not the movable member has a tip, or detachable part, laterally, or otherwise, movable with respect to its remaining portion. In this connection, although elongate valve plungers having detachable forward portions, or forward portions containing captive sealing elements movable within limited spaces, are known, the parts of all such plungers of which I am aware are fastened together for use and any serious cocking of the body of a plunger of this type in a valve body hollow has the effect of throwing the plunger off center, so to speak, as a result of which properly directed pressure cannot be brought to bear on that part of the plunger in contact with a valve seat, and the valve is therefore subject to leakage around at least part of its valve seat periphery, when the plunger is subjected to valve-closing actuation. In short, no substitute for the conventional needle valve inherently free from the cocking defect peculiar to the use of an elongate movable member in the above-indicated manner has yet, to my knowledge, been proposed.

SUMMARY OF THE INVENTION

The novel valve of this invention is uniquely designed to function in such fashion as to avoid all of the above-noted shortcomings of the conventional needle valve. The parts of the valve are of simple construction, and can be assembled for use at low cost to produce a valve mechanism capable of trouble-free operation over extended periods of time. More specifically, these parts comprise a valve body having an inlet, or feed, liquid passageway and a hollow, of substantially larger cross section than the passageway, disposed in open communication therewithin; a flat (preferably disc-shaped) sealing member; and a ball constructed of a hard material suitably resistant to any liquid with which it might come into contact in use. The inlet liquid passageway extends into the hollow through a cylindrical projection from the innermost wall of the latter, which projection terminates in a rim defining the forward, or downstream, opening of the passageway. This rim serves as a valve seat against which the aforesaid sealing member is designed to fit for valve-closing purposes. The sealing member and ball fit slidably within the hollow in the valve body, with the sealing member disposed transversely thereacross in the proper position to fit flush against the valve seat, in perpendicular relationship to the axis of the inlet liquid passageway, when the valve is actuated to its closed position.

In its preferred form for carburetor float valve utility, my novel valve is of somewhat elongate form and the inlet liquid passageway, as well as the hollow in which the sealing member and the ball are slidably disposed, are of round cross section. The aforesaid passageway and hollow are concentrically disposed about, although partially offset along, a common axis. The sealing member is preferably a relatively flat disc of a suitably fuel-resistant rubber, specific examples of which will later be given, sized to fit slidably within the cylindrically walled hollow when disposed transversely thereacross in the above-indicated position of use. The ball is, likewise, sized to fit slidably within the cylindrical hollow of the valve body.

The aforesaid ball is preferably solid, and of a hard, fuel-resistant material such as a suitable steel or brass alloy, nylon, or the like. The hollow in the valve body in which the disc and the ball of the valve mechanism are slidably disposed has a mouth, or opening, at the end of the valve body opposite to its fuel inlet end. The positions of the sealing member and the ball within the hollow are such that the former is disposed between the ball and the valve seat and valve-actuating pressure can be brought to bear against the ball to force the sealing member against the valve seat to close the valve. The rim of the opening, or mouth, of the aforesaid hollow is peened to provide an inturned lip therearound. The inturned lip defines an opening through which the ball can partially extend, but not pass completely through. This lip serves to prevent escape of the ball from the hollow, while permitting sufficient freedom of movement of the ball for valve-actuating purposes.

The axial distance within the aforesaid hollow between the valve seat at the forward end of the cylindrical projection from its innermost wall and the inturned lip around its mouth is sufficient to permit movement of the ball and sealing member between their valve-open and valve-closed positions, as hereinafter described. When the valve is closed, the sealing member is in pressing contact with the aforesaid valve seat, and when it is open, that member is simply backed away from the valve seat to permit the unhindered flow of fuel through the liquid passageway opening thereby exposed. As will be appreciated by those skilled in the art, there need be very little clearance between the valve seat and sealing member to permit such unhindered flow of fuel, since the instant the latter moves away from sealing contact with the valve seat, the entire area of the aforesaid opening is clear for the passage of fuel.

My novel carburetor valve is uniquely designed for minimal movement of the aforesaid sealing member between its valve-open and valve-closed positions, consistent with quick-response valve action for accurate float chamber fuel level control and maximum capacity fuel flow through the inlet liquid passageway of the valve when the latter is in its wide-open position. These objectives are readily achievable at relatively small limits of sealing member travel, by comparison with the much greater travel distance of needle valve plungers between their positional extremes.

As will be apparent from the above description of the body of my unique carburetor valve in its preferred form, there is an annular space between the cylindrical wall of the ball-containing hollow and the cylindrical projection of the inlet liquid (or fuel) passageway therewithin, which runs from the valve seat at the downstream end of the passageway to the bottom of the hollow. Equiangularly spaced around the valve body, between the valve seat and the bottom of the ball-containing hollow therein, are a plurality of bore holes through the valve body wall. These holes serve as bleed, or outlet, ports for the escape of fuel passing through the valve from the hollow in the valve body into the carburetor float chamber. Because of its short range of permissible travel within the valve body hollow, the aforesaid sealing member runs no risk of getting stuck in a cocked position in the hollow to cause malfunctioning of the valve. In this connection, the sealing member's range of movement is so limited that it does not have a chance to get an edge jammed in said annular space between the cylindrical projection of the inlet liquid passageway from the bottom of the valve body hollow and the wall of said hollow, as could conceivably happen were the sealing member permitted a greater latitude of travel.

In addition to the limited-sealing member-movement feature of my novel carburetor valve in its preferred form, the valve has other features which mitigate against any reasonable possibility of valve malfunctioning as a result of cocking, or other displacement, of the sealing member within the valve body. For example, the relative diameters of the cylindrical projection of the inlet passageway and the valve body hollow are such as to contribute significantly to that end. Furthermore, the aforesaid outlet ports in the valve body have their inner openings sufficiently far removed from the downstream end of the inlet liquid passageway (in the upstream direction relative to the direction of liquid flow through said passageway) to obviate any possibility of sealing member edge tilt to the vicinity of such an opening during operation of the valve. Consequently, there is no chance for the sealing member edge to catch on any minute burrs, or rough edges, around the openings and cause malfunctioning of the valve. For this reason, the sealing member can be cut with flat faces and a flat edge (with 90° corners between the edge and the faces), rather than made with a rounded edge (and no 90° corners) as would be necessary if there were port openings in the wall of the valve body hollow within the reach of the sealing member edge to permit hangup between burrs therearound and a sharp boundary of the edge. It is, however, as will be seen, within the scope of my invention to employ a disc with such a rounded edge as the sealing member of the invention.

The novel valve of this invention, in its preferred form, is adapted for use as a substitute for the conventional needle valve in a carburetor float valve assembly and, when so employed, is actuatable by the lever arm of a float similarly to the way in which a needle valve is actuated. Where the valve is thus employed, however, the float lever arm is required to travel only a fraction of the distance of travel for actuation of a conventional needle valve between its fully open and fully closed positions. As a result, my valve is much more rapidly and positively responsive to minute changes of fuel level in a carburetor float chamber than is a needle valve, hence is much more effective than the latter in accurately maintaining the proper fuel level therein.

Because of the resilient character of the fuel-resistant rubber from which the sealing member of my valve in its preferred form is made, the valve can be effectively closed even when small particles of dirt, or the like, are lodged between the sealing member and the valve seat, the resiliency of the rubber making it possible for the sealing member to deform itself in such fashion as to close off any gaps between it and the valve seat which would be present, as a result of the obstructing dirt particles, were such resiliency lacking. Furthermore, the ball component of the valve mechanism is, by virtue of its spherical shape, always properly centered within the valve body hollow to exert force at the proper point on the sealing member to achieve most effective sealing contact between it and the valve seat, when the valve is closed, and can never become cocked, or misaligned, within its housing, as a result of vibration, or other disturbing influence, to cause valve leakage, as can the valve plunger of a conventional needle valve.

From the foregoing, it will be apparent that I have, by the present invention, provided a unique valve, particularly adapted for use as a carburetor float valve, which is of simple construction, inexpensive to produce, and capable of trouble-free operation, minus the difficulties attendant upon the use of conventional needle valves, or their equivalents, in carburetor float valve assemblies. My novel valve is assembled from components of relatively simple design which cooperate with smooth effectiveness to provide superior valve action absent the above-mentioned disadvantages of leakage through misaligned or dirt-separated parts; undue wear on meeting parts (since there is no metal-to-metal contact); etc.; of conventional needle valves. Moreover, because of the complete absence of obstruction in the valve seat opening of my valve body, when the sealing member is removed therefrom, a smaller opening suffices than is required for a conventional needle valve, which latter has a part of its plunger nose projecting through the opening until the plunger has moved a substantial distance away therefrom. My smaller valve opening results in lower back pressures in the closed valve than are present in a needle valve, thereby assuring more effective valve closure, and avoiding the leakage problem to which conventional needle valves are heir when fuel pump pressures are high and the pump valves are incapable of "leaking back." The complete freeing of the valve seat opening of my new valve the instant the sealing member moves away therefrom makes for instantaneous response to the fuel demands of automobiles moving at high speeds, and avoids the previously mentioned "leaning out" problem encountered with conventional needle valves because of the partial blocking of valve seat openings by their plunger noses during periods of high-speed automobile driving.

It is thus a principal object of this invention to provide a valve of simplified construction and low manufacturing cost which is capable of trouble-free operation over extended periods of time, and is particularly suitable for use in carburetor float valve assemblies.

It is another object of the invention to provide such a valve capable of long-life operation without leakage under all conditions of service and fuel pump pressures encountered in modern-day carburetors, and in the presence of dirt-contaminated fuels such as are frequently found in the fuel pumps and gasoline tanks of today.

It is a related object of the invention to provide such a valve inherently free of the parts misalignment, and consequent leakage, tendency of conventional needle valves.

It is still another object of the invention to provide such a valve inherently capable of assuring substantially constant fuel levels in carburetor float chambers under all conditions of carburetor usage.

It is yet another object of the invention to provide such a valve substantially free of the parts wear and deformation, and consequent early valve failure, characteristic of the conventional needle valve.

It is a still further object of the invention to provide improved carburetor float valve means capable of exerting adequately accurate and reliable fuel flow control for automobile engines, running or at rest, to obviate flooding danger and contribute to significantly more efficient and economical engine operation.

Other objects, features and advantages of the invention will become apparent in the light of subsequent disclosures herein.

DESCRIPTION OF DRAWINGS

FIG. 1 is a fragmentary plan view of an uncovered float chamber of a typical automobile carburetor with a preferred embodiment of a float valve in accordance with this invention installed in operating position therein.

FIG. 2 is a fragmentary view, mostly in section, of the float chamber and valve, taken along line 2-2 of FIG. 1, drawn to a slightly smaller scale than FIG. 1, and showing a section of a carburetor cover in place over the float chamber.

FIG. 3 is an enlarged view, mostly in longitudinal section, of the valve in its closed position, showing, additionally, a fragmentary view, in longitudinal section, of the lever arm of a float positioned in the float chamber in contact with the valve FIG. 4 is a fragmentary view of the valve and float lever arm, similar to the FIG. 3 view, but showing the lever arm moved away from the valve and the latter in its open position, and including directional arrows to indicate liquid flow paths through the valve.

FIG. 5 is a cross-sectional view of the valve, taken along line 5-5 of FIG. 3.

FIG. 6 is a perspective view of a modified form of sealing closure member.

DESCRIPTION OF THE PREFERRED EMBODIMENT

Turning now to the drawings, with emphasis first on FIGS. 1 and 2, there is shown generally at 16 a preferred embodiment of a carburetor float valve in accordance with this invention, referred to hereinafter as valve 16, installed in a typified version of a float chamber C of an automobile carburetor in operating position on a car and containing a body of gasoline fuel 46 which fills it to the proper level therein. Except for valve 16, all parts of the illustrated float chamber and valve assembly are conventional. Float chamber C comprises a fuel bowl 42, forming an integral part of a carburetor housing 52 which is shown fragmentarily in FIG. 1, and a portion of a removable cover 44 for the carburetor housing which overlies the fuel bowl, and seals the latter around the rim, when installed in place, the cover being shown so installed in FIG. 2.

Mounted within float chamber C is a buoyant float member F, to which is attached a curved lever arm 10. The lever arm 10 is pivoted on a pivot pin 12 running transversely across the upper portion of fuel bowl 42 in the manner illustrated in FIGS. 1 and 2. The pin is supported at its ends in receptive indentations in the top of a pair of horizontal ribs 14, integral with the side walls, and running upwardly from the bottom, of the bowl. One of these ribs is shown in front elevation, in its substantial entirety, in FIG. 2. Pivot pin 12 has rounded ends which bear against the sidewalls of the fuel bowl, in the manner illustrated in FIG. 1, with sufficient frictional force to prevent vertical movement of the pin from its proper position during normal use and functioning of the carburetor incorporating float chamber C.

The float-lever arm pivot-pin assembly is, as previously indicated, merely representative of apparatus already well known in the carburetor art. Moreover, this assembly is mounted and functionally cooperative with valve 16 similarly to the way it is mounted and cooperative with a conventional needle valve, although, as will be seen, much more precise control of the fuel level in float chamber C is possible with valve 16 than with a needle valve because of the unique manner of functioning and quick-acting response to fuel level changes of the former.

Fuel bowl 42 of float chamber C is connnected to a fuel line 40, running from a fuel pump, not shown, by means of a fitting 41, in the manner illustrated in FIG. 1. The fuel bowl is formed at one end to provide an internally threaded socket 18, serving a purpose soon to be revealed, and a conduit 20, which is aligned with line 40 to permit the uninterrupted flow of fuel from the fuel pump into the conduit.

Valve 16 has an elongate body 22, with an upper segment of hexagonal crossesectional periphery and a lower segment 23 of reduced cross-sectional size and round cross-sectional periphery. The lower segment of the valve body is externally threaded to permit its engagement with socket 18 in the manner illustrated in FIG. 2. Valve body 22 has a shoulder 54 separating its hexagonal upper segment and lower segment 23, and a gasket 50 is provided as a seal between this shoulder and the rim around the top of socket 18, when the valve is mounted in the socket in the above-indicated manner, the gasket being shown in its properly installed position in FIG. 2. As FIG. 2 makes clear, the positioning of valve 16 in socket 18 as indicated places the valve in the path of fuel flow from conduit 20 to float chamber C for proper control of said flow in accordance with present teachings.

Body 22 of valve 16 has an inlet fuel passageway 24, of round cross section, running concentrically upwardly from the lower end of its reduced segment 23, and a hollow 26, also of round cross section, running downwardly from a mouth, or opening, in its upper end. The foregoing is couched in terms of reference to the valve position illustrated in the drawing, which position will, for convenience of description, be hereinafter assumed in the absence of any statement to the contrary. It should however, be understood that the valve lends itself to use in other positions, including the reverse of that shown in the drawing, positions of horizontal orientation, etc., even more readily than does the conventional needle valve whose use versatility in all such positions is well known.

The hollow 26 in valve body 22 is of substantially larger cross-sectional diameter than the downstream end of fuel passageway 24, and is, similarly to the latter, disposed concentrically about the axis of the valve body, as the drawing well illustrates. Passageway 24 extends into hollow 26 through a necklike projection or tubular extension 28, integral with the bottom of the hollow at one end, which terminates, at its other end, in a thin rim 31 encircling the downstream opening of the passageway. This rim serves as a valve seat for a disc 30, movably disposed within hollow 26, and will therefore be hereinafter referred to as valve seat 31. The upper end of the necklike projection is chamfered, as shown at 29, to achieve the thin valve seat rim around the passageway 24 opening.

Captive within the hollow 26 of valve body 22 are the disc 30, previously referred to, and a ball 32, the disc being interposed between the ball and valve seat 31 in a position of transverse orientation within the hollow, as illustrated in FIGS. 2, 3 and 4. Disc 30 is molded from a relatively soft, rubbery material possessed of sufficient resilience to engage valve seat 31, and close off the downstream opening of passageway 24 (hereinafter referred to as the valve seat opening), against fuel passage, even in the presence of small dirt particles, or the like, under the influence of relatively slight downward pressure on its upper side. In addition to being adequately resilient for this purpose, the disc material should, of course, be resistant to the chemical, or other, action of any fuel with which it will come into contact in use. Various known materials meet these requirements, a preferred example of which I have found, from experience, to be Buna N, a synthetic rubber produced by the copolymerization of butadiene and acrylonitrile. Other rubbery materials suitable for the purpose are certain fluoroelastomer compositions, as exemplified by Viton A-HV and Viton A (these being the trade names of copolymers of hexafluoropropene and vinylidine fluoride manufactured by E. I. DuPont de Nemours & Co., Inc.), and Viton B, the trade name of a terpolymer of hexafluoropropene, vinylidine fluoride and tetrafluoroethylene (also manufactured by DuPont).

The disc 30 is sized to fit slidably within the lower portion of hollow 26 in valve body 22. As the drawing makes clear, particularly in FIGS. 3 and 4, the disc is positioned transversely within the hollow, and, as will be seen, is permitted to move through a relatively short axial distance therewithin. The disc is constrained to movement in its transverse position within hollow 26 because of its limited freedom of travel in, and a relatively close fit with the cylindrical wall of, said hollow. In the latter connection, the clearance shown in the drawing between the peripheral edge of the disc and the defining wall of hollow 26 is somewhat exaggerated for better illustrative effect. The preferred clearance between the disc and hollow wall is just sufficient to permit substantially frictionless sliding of the disc in the valve body, although greater clearances than this are permissible within the scope of my invention.

Ball 32 is preferably solid, and made of a hard material, such as, for example, a suitable steel, or other metal, alloy, nylon or the like, substantially resistant to the chemical action of gasoline fuels. Valve body 22 is likewise made of a suitably hard material, metallic or otherwise, substantially resistant to attack by such fuels. Preferably, the valve body is made of a suitable brass alloy, but other metals, or metal alloys, known to those skilled in the art as acceptable for the purpose, can be employed in lieu thereof, if desired. The class of suitable candidate materials for these parts is so well known to those skilled in the automotive, and related, arts, as to require no further discussion here.

As in the case of disc 30, the ball 32 is sized to fit slidably within the hollow 26 in valve body 22, except that it fits in the upper, rather than the lower, portion of that hollow. The clearance between the ball 32 and the wall of hollow 26 is exaggerated in the drawing, being preferably somewhat less than that shown, yet, as in the case of disc 30, sufficient to permit substantially nonfrictional sliding movement of the ball within the valve body.

As the drawing shows, the upper portion of hollow 26 is of somewhat greater cross-sectional diameter than its lower portion, the two portions of the hollow being divided by a frustoconical segment 34 in an otherwise cylindrical wall. The upper portion of the hollow houses the major part of ball 32, and the lower portion, of smaller diameter, houses the disc 30, whose upper limit of travel falls below the frustoconical segment 34 of the hollow wall. This division of the hollow into segments of differing cross-sectional diameter is for purposes of design sophistication only, and the hollow could be of uniform cross-sectional diameter throughout its length, if desired, within the scope of the invention. Similarly, the inlet fuel passageway 24, running upwardly through the lower portion of valve body 22, is divided into upper and lower segments of differing cross-sectional diameter, although here, the upper segment, rather than the lower one, as in the case of hollow 26, is of the smaller size. The more restrictive (upper) segment of passageway 24 terminates at valve seat 31, as will now be evident, where feed fuel for float chamber C leaves the passageway when the valve is in the open position.

FIG. 4 shows valve 16 in the open position, and as will be apparent, disc 30, although backed off only a short distance from its closed position, offers no obstruction to the flow of fuel through the downstream opening of passageway 24. In fact, the instant disc 30 moves clear of valve seat 31, the entire opening of the passageway is clear to permit such fuel flow into hollow 26. Because of this "instant opening" feature of my novel valve, fuel passageway 24 can be of relatively small cross section at its discharge end, as opposed to the necessity for a relatively large opening in the discharge end of its counterpart passageway in a conventional needle valve.

From the foregoing, it will be evident that the valve seat opening of valve 16 is substantially smaller than its opposite number in a conventional needle valve, a feature contributive to improved valve action because of the lesser amount of force required to seal the valve seat opening against fuel pump pressures as a result of the smaller area for such pressures to act across. As those skilled in the art will appreciate, this makes for significant improvement in valve response time to changing float chamber fuel levels, and in valve effectiveness against leakage. While, for reasons valve designers can appreciate, the slightly necked-down version of the inlet fuel passageway exemplified by passageway 24 is consistent with good valve design, this is not a critical feature of my invention. Accordingly, passageway 24 can be of uniform diameter throughout, or otherwise shaped, so long as it satisfactorily serves its intended purpose as taught herein. As previously indicated, and FIG. 5 shows to best effect, the upper portion of valve body 22 is hexagonal in cross-sectional periphery. Disposed equiangularly about the valve axis, are three bleed holes or outlet ports 36. These holes run perpendicularly through the valve body wall, just above the level of the bottom of hollow 26, their purpose being, as the name implies, to permit divergent fuel flow from the valve body, as suggested by the directional arrows of FIG. 4, when the valve is in its open position. It will be understood, of course, that some of the fuel, instead of going through bleed holes 36, makes its way upwardly in hollow 26 and around ball 32, to exit from the mouth of the hollow, when the valve is open.

At it upper end, valve body 22 is chamfered around, and has an inturned lip 37 defining, the mouth of hollow 26. This terminal configuration is preferably achieved by beveling the upper end of the valve body until there is a relatively thin rim around the mouth of hollow 26, then peening the rim to form lip 37. The lip is formed to extend inwardly far enough to prevent the escape of ball 32 from hollow 26, yet permit sufficient freedom of movement of the ball within the hollow to allow valve 16 to function in the manner taught herein.

As will now be apparent, valve 16 is urged to its closed position by pressure on ball 32 from lever arm 10 of the float member F when the fuel level within chamber C rises to a sufficient extent to warrant this action. As the fuel level drops, the float moves downwardly, and lever arm 10 swings in the clockwise direction, as viewed in FIG. 2, and lessens its pressure on ball 32. When the level of fuel in the float chamber drops to a sufficient extent to permit the valve to open, disc 30 is forced upwardly, away from valve seat 31, by the fuel pressure in passageway 24, and fuel flows into float chamber C to raise the fuel level therein. This fuel level is, of course, subject to constant flux as fuel enters and leaves the float chamber during operation of its embodying carburetor, the degree of flux, however, being held to a minimum by the quick responsiveness of valve 16 to small fuel level changes. In the latter connection, no means of fuel exit from float chamber C is shown in the drawing because the particularly selected views of the chamber did not permit this, those skilled in the carburetor arts are thoroughly familiar with such fuel exit means and the present invention is not directly concerned with the outflow particulars of a carburetor float chamber. The FIG. 4 view of the upper portion of valve 16, and a fragmentary portion of float lever arm 10 out of contact with the valve, shows an exaggerated separation of the lever arm and valve for purposes of more effective illustration, the float level within flat chamber C being actually more controllable by valve 16 than the position of the lever arm in FIG. 4 would indicate.

It will now be apparent that any valve closing force exerted on ball 32 by lever arm 10 of float member F will, because of the shape of the ball, and its snug fit within hollow 26 of the valve body, always be transmitted through the ball to the substantial center of disc 30. Thus, there is no chance for the ball or disc to become misaligned in such a way as to improperly channel force from the float member lever arm, and thereby cause uneven sealing contact between the disc and valve seat 31 with consequent danger of valve leakage similar to that which occurs when the plunger of a conventional needle valve becomes misaligned within its housing during the relatively wide fluctuations between valve-open and valve-closed positions to which it is subject in use. In this connection, the relatively short ranges of travel of ball 32 in valve 16 makes it even less likely than would otherwise be the case, that either it or disc 30 could become stuck, or cocked, in the valve body in such a way as to cause valve leakage, engine malfunctioning, and/or other difficulties of the sort occasioned by the previously mentioned plunger sticking, or cocking, tendencies of conventional needle valves.

The present invention has been described in considerable detail in order to comply with Patent Office requirements for a full public disclosure of at least one of its embodiments. Such detailed disclosure is not, however, intended to correspondingly limit the scope of the patent monopoly sought to be granted. Accordingly, while my novel valve has been herein illustrated and described in what is considered to be a preferred embodiment, it is emphasized that departures may be made therefrom within the scope of my invention. Certain of these departures have already been mentioned, and others will occur to those skilled in the art in the light of present teaching. Exemplary of the latter are noncritical variations of the shapes of various parts, or features, of the valve; mere refinements of the illustrated valve design; etc. More specifically, examples of such modifications include changes in the shape of the outer periphery of the hexagonal portion of the valve body; changes in the cross-sectional shape of the inlet fuel passageway or the ball-confining hollow of the valve body; the substitution of a rigid, but hollow, ball for 32; the substitution of a round resilient member with an encircling metal ring of C-shaped cross section for disc 30 (such a substitute 38 for the disc being illustrated in FIG. 6 of the drawing); etc. Other examples of valve modification within the scope of my invention could be enumerated, but the foregoing are believed adequately illustrative for present purposes.

While the above description has strongly emphasized the carburetor float valve applicability of my invention, it should not be forgotten that the valve has, as previously noted, broader use potential than this, and can be employed for whatever service its unique capability suits it. It is emphasized, in final summary, that the scope of the invention includes all of its variant forms encompassed by the language of the following claims.

1. In a liquid flow control valve:
   a body having a cylindrical chamber therein;
   an inlet passage having a port communicating with said cylindrical chamber substantially centrally of one end thereof;
   means defining an annular valve seat around said port;
   a circular disc of elastomeric material loosely slidable in said chamber toward and from said valve seat, the cylindrical wall of said chamber being imperforate and continuous throughout the range of sliding movement of said disc;
   a rigid ball loosely slidable in said chamber and engageable with said disc on the side thereof opposite said valve seat, a portion of said ball projecting through an open end of said chamber opposite said one end; and
   at least one outlet passageway communicating with said chamber at a position axially displaced from said valve seat in a direction away from said ball.

2. A valve as defined in claim 1 wherein said body is adjacent a carburetor float chamber, said outlet passageway communicating with said float chamber;
   a float pivotally mounted in said float chamber and having an extending lever portion engaging the portion of said ball projecting from said cylindrical chamber.

3. A valve as defined in claim 1 including an inturned lip on said body, at its open end, to retain said ball in said cylindrical chamber.

4. A valve as defined in claim 1 wherein said valve seat comprises an annular projection extending axially from said one end of said cylindrical chamber, there being an annular channel around said projection.